May 15, 1951 — O. WATMOUGH — 2,553,522
PLOW LIFT MECHANISM FOR CULTIVATORS
Filed Aug. 16, 1948
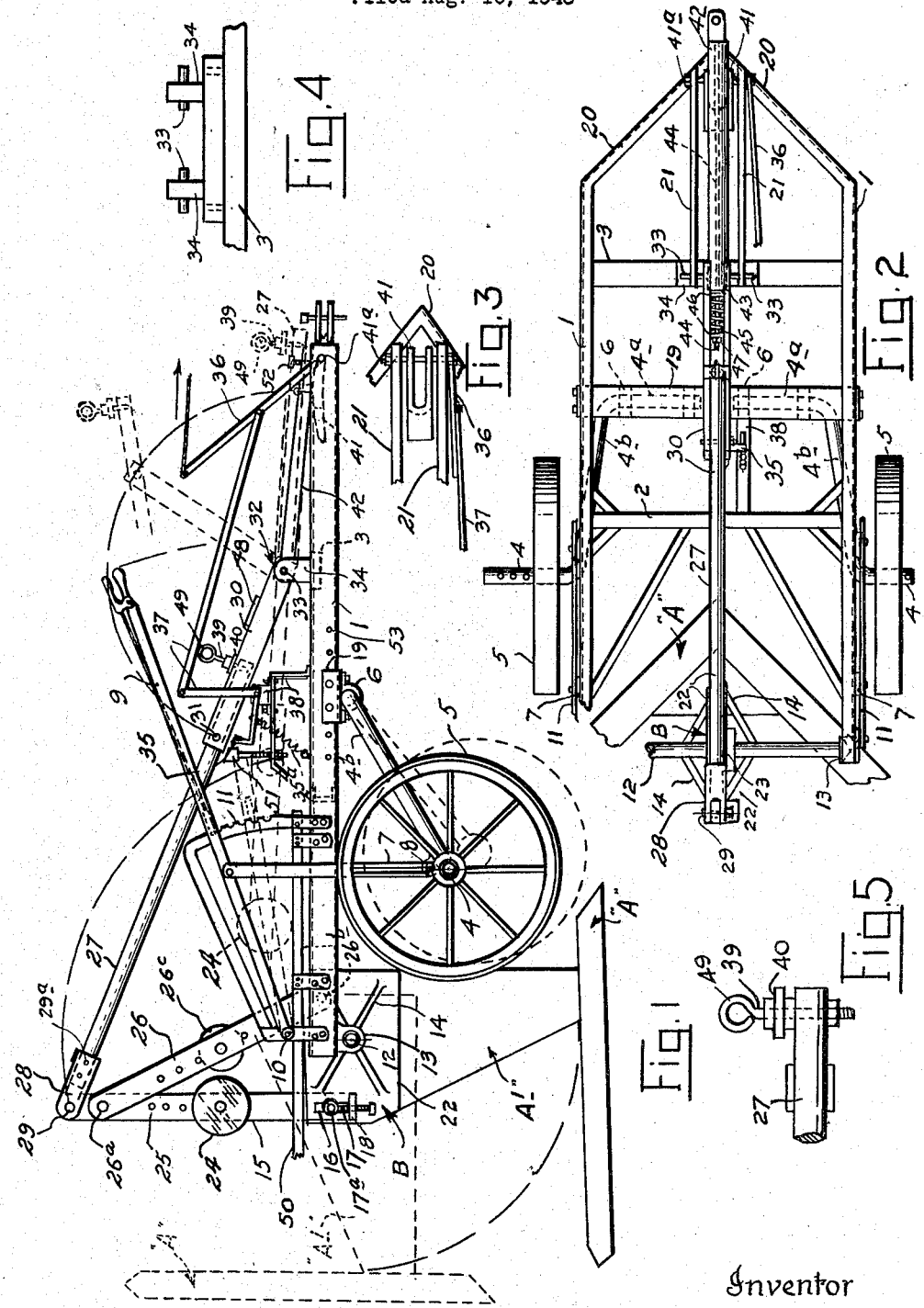
Inventor
Oliver Watmough
by W. S. J. Miller
ATTORNEY Patented May 15, 1951

2,553,522

UNITED STATES PATENT OFFICE 2,553,522

PLOW LIFT MECHANISM FOR CULTIVATORS

Oliver Watmough, Lethbridge, Alberta, Canada

Application August 16, 1948, Serial No. 44,535
In Canada June 10, 1947

1 Claim. (Cl. 97—245)

My invention relates to a land cultivator, the objects of which are to provide a machine of this kind which incorporates various improvements as to parts which function in combination with one another and with the cultivator as a whole, such as the tool carriage as an efficient means of engaging, lifting, holding and carrying large type cultivator shovels, and bladed subsoilers, ditchers and other like mobile machines for breaking ground and shifting the soil.

My invention also provides means for locking the cultivator blades, or the shovel, in working position, and also a means of lifting the same by utilizing the momentum gathered by the moving machine in its forward travel when desired, so that by being thus lifted these parts may be conveniently carried on the machine and at the same time locked in place.

A particular advantage in my machine is that the cultivator apparatus may be fully controlled by the operator from where he is seated in the hauling tractor, and that there are auxiliary means provided for manipulation to assure that the shovel becomes securely locked clear of the ground by the momentum and a counterweight mounted for this purpose, which auxiliary means are only necessarily used to start the locking effect when the machine is travelling at an exceptionally slow rate of speed, and the adjustable weight to operate the locking means is set for higher speeds.

A further advantage is that when it is desired that the shovel or blades are lowered all that is required to be done is that the operator stops the tractor, pulls a trip lever, notes that the blades contact the ground, and reverses the tractor a short distance, and rocks over the blades, thus automatically locking them in cultivating position, all of which procedure is extremely simple, and is a saving in man power.

With these objects and advantages in view this invention consists in the novel features of construction hereinafter described and claimed, and in the drawings it must be observed that similar numerals refer to similar parts throughout the different views.

Fig. 1 is a side view of the machine showing the cultivator blades in contact with the ground, and movements of parts defined.

Fig. 2 is a plan view of Fig. 1.

Fig. 3 is a plan detail in part of the fore end showing the trip lever for unlocking ready to cultivate.

Fig. 4 shows in enlarged detail pivot shafts and their brackets supporting the plow-lifting crank arms.

Fig. 5 is an enlarged detail of the crank held end of plow lowering and raising shaft, showing stop washer and screw bolt and its crank arms for proper locking.

In the drawings the numeral 1 refers to a chassis rigidly cross braced, one such brace 2 being sufficiently distanced from the rear of the frame for the clearance of certain swingable members within the structure, as later described. A front cross brace member 3 is also specifically positioned as shown for reasons later explained.

The chassis 1 is mounted towards its rear end on a pair of axles 4 and wheels 5, the axles having offset parallel arms to provide a crank action, the main axle portion 4a being pivotally supported by bearings 6 on the underside of the chassis side members, and the wheel axle portions 4 carrying the wheels. A rod 7 is pivotally coupled at 8 to each of arm portions shown as 4b connecting the two said portions of the axles 4a and 4, this rod being the connecting link between each axle and a hand lever 9 on each side of the chassis and pivoted at 10. These hand levers have a pawl and ratchet engagement with toothed quadrants 11 for height adjustments of the machine relative to ground level.

Since the object of this machine is to raise and lower a conventional cultivator and weeding apparatus, such is not included as invented matter. This apparatus comprises a V-shaped shovel and its vertical supporting fin, these parts being designated as "A" and "A1" respectively. This shovel member, being herein also referred to as the tool, is lowered, leading point down, and the machine is backed on its wheels so that it rocks on to the tool, and the tool will then penetrate the ground.

My invention mainly consists in the means adopted to accomplish the lowering and raising of this tool and the locking and unlocking of same in its working and for its carried positions. To achieve my objects the vertical fin "A1" is rigidly attached to a horizontal transverse shaft 12 which is journaled in bearings 13 below the ends of the chassis side members. This shaft and member "A1" are strongly braced by flanges 14.

A lift bar 15 is adjustably and pivotally affixed to the upper trailing end of the fin member "A1," and the fin is slotted at 16 for adjusting the angular relationship of the tool "A" with the lift bar for the proper tilting of the tool in plowing operations. This adjustment is accomplished by means of a screw bolt 17 threaded through a bracket 18 projecting from one side of the fin member. This bolt bears against a clamping screw bolt 17a projecting horizontally from the lift bar 15 which is contacted by the said bolt 17 for height adjustment of the tool.

The bearings 6 are indirectly mounted on the chassis frame by means of a center beam 19 traversely bridging the side members 1 of the chassis. These members 1 extend angularly inwardly at 20 in a forward direction and are joined to form a means for attachment of the machine to a tractor. Thrust members 21 rigidly brace this forward frame portion to the cross member 3.

A tool-supporting assembly at "B" comprises heavy metal plates 22 to which the fin "A1" is attached, and forms a solid connection with the shaft 12. These plates 22 are centrally disposed on the cross shaft 12, as at 23, and, as before mentioned, flanges 14 form a rigid connection between the shaft 12 and these plates. The lift bar 15 coordinates with the plates 22 in an adjustable manner by its bolt and slot connection therewith, and a counterweight 24 is bolted to the bar 15 which is provided with holes for varying the position of the counterweight.

A pair of plates 26 are braced between the forward top corners of the plates 22 and near the top of the lift bar 15, being attached thereto by pivot pins 26a and 26b respectively, and a weight 26c is supported between these two plates, which weight may be adjusted as to its position therebetween as occasion arises for counterweighting the tool during the raising process as later described.

A rod 27 is connected to the top end of the lift bar 15 by means of twin straps 28, which are pivoted to the bar by a wrist pin 29. The connection at this point between the rod 27 and its straps 28 is by shear pins 29a in order to guard against severe shock between this rod and the lift bar and the tool combination while cultivating. The forward end of this rod 27 is coupled to twin crank arms 30 by a cross pin 31, the arms being pivotally hinged at 32 by shafts 33 mounted rigidly in brackets 34 carried on cross bar 3. There is therefore a knee action between the rod 27 and its pivoted crank arms 30 in an upward direction when pressure is brought to bear on the underside of the arms 30 to swingably deflect this coupling. To accomplish this action an unlocking trip lever 35, which is held in disengaged position by a spring 35a, upsets the axial locked alignment between the rod 27 and the said arms 30 upwardly, as a result of manipulating a hand lever 36 pivoted on the chassis, which lever is interconnected with a system of levers 37.

The arms 30 swing radially about their pivot pins or shafts 33 when the trip lever 35 is manually elevated for that purpose, which results in the tool "A" and its fin member "A1" being pivoted upwardly as the machine continues to travel forward. The weight 24 counters this tool assembly when the fin is assuming a more or less horizontal position. The said finger trip 35 is pivotally mounted on a bracket 38 affixed on top of the chassis frame.

On the forward end of the rod 27, and enclosed within the twin arms 30, is a stop bolt 39 having a stop washer 40 straddling the arms so placed to prevent the possibility of a reverse knee action between the rod and the pivotally attached arms. However, a slight reverse relationship between these members is allowed for to assure locking therebetween when the tool "A" is operating in the ground. This stop bolt 39 is the screwable means of adjustment to provide for this reverse deflection of these pivoted members. A positive locking effect is thus provided until upset by a pull on the lever 36, which lever together with the finger trip 35, provide the unlocking means allowing the arms 30 to swing radially about their shafts 33 in a forward direction. The forward positions of the rod 27 and the arms 30 provide a substantially rigid lock to hold the tool parts "A" and "A1" in their carried position.

A U-shaped trip lever 41 is disposed at the forward end of the chassis frame, and is mounted on a spindle 41a carried transversely by the thrust members 21. This lever 41 serves as a releasing member for starting the lowering of the tool parts from their carried position. To accomplish this release action the lever 41 lifts the ends of the arms 30 when they are in their forward position, the lever being operated by a pull on the lever 36 as extended beyond its pivotal connection with the said lever system 37. It is important that the lengths of the members 15, 27 and 30 be accurately determined for their locking and unlocking relationship to effect the lowered and the raised positions of these tool parts.

As soon as the finger trip 35 has been manipulated the pressure against the tool "A" while travelling, automatically sets in motion the means to raise the tool into its carried position. As the tool "A" drops from its carried position as explained, the operator reverses the travel of the machine for about three feet to allow the tool to become rigidly locked in its working position, as the pivot pin 31 resides slightly lower than a straight line drawn between pivot shafts 33 and the wrist pin 29.

The lever 36 and the trip lever 41 are rigidly associated, and are together mounted on the said spindle 41a. With further reference to the lever 36, this serves two purposes: firstly it is the means of effecting the locking of the tool "A," through its association with the finger trip 35 in its down position, and secondly it is the means for controlling the trip lever 41.

A plate 48 bridges across the top of the arms 30 as seen in Figure 1, on which plate the rod 27 rests after the arms are swung over as the members "A" and "A1" assume their carried position.

The bolt 39 has an eye 49 which may be used as an auxiliary handling means for starting the knee action between the rod 27 and the arms 30 for their mutual deflection for locking the tool parts in their carried position as the lift bar 15 swings forward.

The counterweight effects of this cultivator or weeder machine are important. On hand release of the locking members the tool is set free and unlocked, and as the machine continues to move forward it is these weights, assisted by the momentum residing in the tool, that eventually raises the tool parts to their carried position.

An extension frame 50 is fragmentally shown in Figure 1, the object of which is to provide means for attachment of other machinery, such as harrow, discs, etc., or to carry extra weights when working in particularly hard ground.

Auxiliary means are provided to act as a stop for the arms 30 when the tool may be violently hindered as it is operating through the soil, which means consist of a screw bolt 51 with a lock nut, and is disposed on the bracket 38. This bolt is screwably adjustable for height to compensate for any slight variation in the necessary sag at the pivot pin 31. A stop bolt 52 is also screwably disposed at the fore end or drawbar end of the machine to act as a stop for the rod 27. Both of these stop bolts are screwable to compensate for the adjustment of the bolt 17, and the variable height of the lift bar 15.

Holes 53 are drilled in each side chassis beam to accommodate the varying positions of brackets 6, when it is found necessary to change the position of the axle 4, relatively with the chassis.

I claim:

In combination with a V-shaped plow tool depending pivotally by means of a fin member and attaching plate from a chassis frame of a cultivator, plates bolted to said fin member for the connection of said fin member with the frame, a transverse fin-supporting shaft integral with said plates, journals on the rear end of the chassis frame carrying said shaft, height-adjustment wheels supporting the cultivator, an axle for each wheel having an offset and parallel axle portion extending therefrom with a crank to provide depth adjustment for the plow tool in the soil, and for transverse levelling of the cultivator on uneven ground, manipulatory means for adjusting the movements of each said crank to raise or lower the chassis frame relative to the wheels and ground, a swingable tool lift bar adjustably connected with said plates for the pivotal raising of the tool when activated as a lever, a counterweight to balance said tool and mounted adjustably on said lift bar, a pair of brace plates connecting said fin member with said lift bar, a counterweight adjustably associated with said brace plates to assist in balancing said fin member, a longitudinal lock rod pivoted at its rear end to the top of said lift bar, radially swingable twin crank arms pivoted to the forward end of said rod and also to the chassis frame to resist lifting movement of the plow tool when said crank arms are in alignment with said rod, a hand-actuated trip means for deflecting these pivotally connected rod and crank arm members at their pivotal juncture in an upward direction, which deflection is continued as influenced by said counterweights to raise the plow tool swingably off the ground, hand-operated trip means, operated in unison with said hand-actuated deflecting trip means and in cooperation with said counterweights and a concurrent rearward movement of the chassis frame, to swing said arms into coalignment with said longitudinal lock rod and lower the plow tool into the ground, and a hitch for attachment of the chassis frame to a tractor.

OLIVER WATMOUGH.

REFERENCES CITED

The following references are of record in the file of this patent:

UNITED STATES PATENTS

| Number | Name | Date |
| --- | --- | --- |
| 1,369,464 | Petroff | Feb. 22, 1921 |
| 2,424,192 | Rogers et al. | July 15, 1947 |